US010412878B2

(12) United States Patent
Karstens et al.

(10) Patent No.: US 10,412,878 B2
(45) Date of Patent: Sep. 17, 2019

(54) DOWN PRESSURE COMPENSATION FOR TILLAGE BASKETS TRAVELING AT VARYING SPEEDS

(71) Applicant: CNH Industrial Canada, Ltd., Saskatoon (CA)

(72) Inventors: Joel Karstens, Saskatoon (CA); James W. Henry, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 184 days.

(21) Appl. No.: 15/359,954

(22) Filed: Nov. 23, 2016

(65) Prior Publication Data

US 2018/0139884 A1 May 24, 2018

(51) Int. Cl.
| | |
|---|---|
| A01B 63/00 | (2006.01) |
| A01B 63/28 | (2006.01) |
| A01B 49/02 | (2006.01) |
| A01B 29/04 | (2006.01) |

(52) U.S. Cl.
CPC ............ *A01B 63/28* (2013.01); *A01B 63/002* (2013.01); *A01B 29/048* (2013.01); *A01B 49/027* (2013.01)

(58) Field of Classification Search
CPC ..... A01B 27/005; A01B 29/048; A01B 35/16; A01B 35/28; A01B 35/32; A01B 63/002
USPC ..................... 172/2, 4.5, 540, 544, 551, 663
See application file for complete search history.

(56) References Cited

U.S. PATENT DOCUMENTS

| | | | | |
|---|---|---|---|---|
| 4,646,850 A | * | 3/1987 | Brown .................. | A01B 35/28 172/551 |
| 4,825,956 A | * | 5/1989 | Kanato ............... | A01B 59/043 172/2 |
| 6,926,093 B1 | | 8/2005 | Fink et al. | |
| 7,017,675 B2 | | 3/2006 | Ankenman et al. | |
| 7,766,093 B2 | | 8/2010 | Becker et al. | |
| 8,275,525 B2 | * | 9/2012 | Kowalchuk ........... | A01C 7/205 111/200 |
| 8,408,149 B2 | * | 4/2013 | Rylander ............... | A01B 63/32 111/140 |
| 8,430,179 B2 | * | 4/2013 | Van Buskirk ........ | A01B 29/048 111/139 |
| 8,528,656 B2 | * | 9/2013 | Van Buskirk ........ | A01B 29/048 111/139 |
| 8,534,373 B2 | * | 9/2013 | Van Buskirk ........ | A01B 29/048 111/139 |
| 8,544,398 B2 | | 10/2013 | Bassett | |

(Continued)

*Primary Examiner* — Gary S Hartmann
(74) *Attorney, Agent, or Firm* — Rebecca L. Henkel; Rickard K. DeMille

(57) ABSTRACT

An agricultural tillage implement including a first frame configured to be moved in a travel direction, at least one second frame coupled with the first frame, at least one rolling basket assembly coupled to the at least one second frame, at least one actuator pivotally connected to the at least one second frame, and a pressure control system operatively connected to the at least one rolling basket assembly. The pressure control system includes at least one sensor coupled to the at least one rolling basket assembly for sensing a load exerted on the at least one rolling basket assembly by a ground surface and providing a downward pressure measurement signal. The pressure control system also includes a controller in communication with the at least one sensor and configured to control the adjustable downward force applied by the at least one actuator.

10 Claims, 2 Drawing Sheets

(56) References Cited

U.S. PATENT DOCUMENTS

| | | | |
|---|---|---|---|
| 8,573,319 B1 | 11/2013 | Casper et al. | |
| 8,601,961 B2 * | 12/2013 | Van Buskirk | A01B 29/048 |
| | | | 111/139 |
| 8,657,023 B2 | 2/2014 | Casper et al. | |
| 8,820,251 B2 * | 9/2014 | Van Buskirk | A01B 29/048 |
| | | | 111/139 |
| 8,839,726 B2 * | 9/2014 | Van Buskirk | A01B 29/048 |
| | | | 111/139 |
| 8,924,102 B2 * | 12/2014 | Sauder | A01C 7/205 |
| | | | 701/50 |
| 9,033,063 B2 * | 5/2015 | Kovach | A01B 49/02 |
| | | | 172/166 |
| 9,113,589 B2 | 8/2015 | Bassett | |
| 9,155,237 B2 * | 10/2015 | Van Buskirk | A01B 29/048 |
| 9,167,740 B2 | 10/2015 | Bassett | |
| 9,215,837 B2 | 12/2015 | Adams et al. | |
| 9,247,687 B2 | 2/2016 | Gray et al. | |
| 9,282,689 B2 * | 3/2016 | Van Buskirk | A01B 63/32 |
| 9,338,937 B2 * | 5/2016 | Sauder | A01C 7/205 |
| 9,686,901 B2 * | 6/2017 | Achen | A01B 49/04 |
| 9,814,172 B2 * | 11/2017 | Achen | A01B 49/06 |
| 9,980,422 B2 * | 5/2018 | Czapka | A01B 63/22 |
| 10,015,927 B2 * | 7/2018 | Fritz | B60L 1/00 |
| 2011/0313572 A1 | 12/2011 | Kowalchuk et al. | |
| 2014/0054051 A1 | 2/2014 | Landoll et al. | |
| 2014/0209335 A1 | 7/2014 | Casper et al. | |
| 2015/0053433 A1 | 2/2015 | Kovach et al. | |
| 2015/0156962 A1 | 6/2015 | Zemenchik et al. | |

\* cited by examiner

DOWN PRESSURE COMPENSATION FOR TILLAGE BASKETS TRAVELING AT VARYING SPEEDS

BACKGROUND OF THE INVENTION

1. Field of the Invention

The present invention relates to agricultural tillage implements, and, more particularly, to a down pressure control system for such implements.

2. Description of the Related Art

Farmers utilize a wide variety of tillage implements to prepare soil for planting. Tillage implements prepare the soil by way of mechanical agitation of numerous types, such as digging, stirring, and overturning. Examples of tillage include plowing (overturning with moldboards or chiseling with chisel shanks), disking, harrowing, sweeping, and cultivating with cultivator shanks.

Tillage is often classified into two types, vertical and horizontal. Generally, vertical tillage is performed with implements such as colters or spider wheels. Horizontal tillage, on the other hand, is performed with implements such as sweeps. The employment of vertical or horizontal tillage depends upon various aspects of a given situation including soil conditions, equipment, crops to be planted, etc.

Some tillage implements may include two or more sections coupled together to perform multiple functions as they are pulled through fields by a tractor. For example, a field cultivator is capable of simultaneously tilling soil and leveling the tilled soil in preparation for planting. A field cultivator has a frame that carries a number of ground-engaging tilling implements for tilling the soil. The field cultivator converts compacted soil into a level seedbed with a consistent depth for providing excellent conditions for planting of a crop. Residual crop material, weeds, or other undesired plants disposed on top of the soil are destroyed and worked into the soil.

At times an optional rear auxiliary implement may be included to perform secondary tasks such as finishing the seedbed in preparation for seeding. For example, a rear auxiliary implement may include a spike tooth harrow, spring tooth harrow, rolling (aka. crumbler) basket, etc., or any combination thereof. The crumbler basket has a reel with multiple blades for breaking up dirt and sod clods into smaller sizes, chopping up the remaining debris on the top of the soil, smoothing out ridges, and slightly packing the field.

The downward pressure on the crumbler baskets, which controls the depth of the reel, is generally maintained by springs. The down force acting on the crumbler baskets is not typically consistent or controllable. At varying speeds, the down force is inconsistent because the varying draft on the crumbler baskets causes the springs to stretch or compress. Further, adjusting the down force applied by the crumbler baskets can be cumbersome as the operator typically has to manually adjust the positioning of the crumbler baskets by changing the positions of pins, bolts, mechanical crank adjustments, or a combination thereof.

What is needed in the art is an easy to use mechanism for sensing down force fluctuation and for positioning rolling baskets of an agricultural tillage implement.

SUMMARY OF THE INVENTION

The present invention provides an agricultural tillage implement with at least one rolling basket assembly and a pressure control system that includes at least one sensor and a controller to provide an equalized and consistent down force during various speeds.

The invention in one form is directed to an agricultural tillage implement including a first frame configured to be moved in a travel direction, at least one second frame coupled with the first frame, at least one rolling basket assembly coupled to the at least one second frame, at least one actuator pivotally connected to the at least one second frame and associated with the at least one rolling basket assembly for applying an adjustable downward force onto the at least one rolling basket assembly, and a pressure control system operatively connected to the at least one rolling basket assembly. The pressure control system includes at least one sensor coupled to the at least one rolling basket assembly for sensing a load exerted on the at least one rolling basket assembly by a ground surface and providing a downward pressure measurement signal. The pressure control system also includes a controller in communication with the at least one sensor and configured to control the adjustable downward force applied by the at least one actuator.

The invention in another form is directed to a rolling basket implement attached to an agricultural tillage implement having a first frame and at least one second frame. The rolling basket implement includes at least one rolling basket assembly coupled to the at least one second frame, at least one actuator pivotally connected to the at least one second frame and associated with the at least one rolling basket assembly for applying an adjustable downward force onto the at least one rolling basket assembly, and a pressure control system operatively connected to the at least one rolling basket assembly. The pressure control system includes at least one sensor coupled to the at least one rolling basket assembly for sensing a load exerted on the at least one rolling basket assembly by a ground surface and providing a downward pressure measurement signal. The pressure control system also includes a controller in communication with the at least one sensor and configured to control the adjustable downward force applied by the at least one actuator.

The invention in yet another form is directed to a method of controlling down pressure of at least one rolling basket assembly coupled to an agricultural implement moving in a travel direction during operation with a variance of speeds. The method includes the steps of providing a first frame configured to be moved in a travel direction, at least one second frame coupled with the first frame, at least one rolling basket assembly coupled to the at least one second frame, at least one actuator pivotally connected to the at least one second frame and associated with the at least one rolling basket assembly for applying an adjustable downward force onto the at least one rolling basket assembly, and a pressure control system operatively connected to the at least one rolling basket assembly. The pressure control system includes at least one sensor coupled to the at least one rolling basket assembly for sensing a load exerted on the at least one rolling basket assembly by a ground surface and providing a downward pressure measurement signal and a controller in communication with the at least one sensor and configured to control the adjustable downward force applied by the at least one actuator. The method includes the further steps of inputting a desired down force range into the controller, sensing a load exerted on the at least one rolling basket assembly, communicating the downward pressure measurement signal to the controller, comparing the downward pressure measurement signal to the desired down force range, and controlling the adjustable downward force applied by the actuator in order to maintain a uniform finish of a field.

An advantage of the present invention is that it provides a uniform field finish because it supplies an even and constant down pressure onto the rolling basket assemblies during varying speeds of operation.

Another advantage of the present invention is that it is easy for an operator to use because the down force adjustments are fully automatic.

Yet another advantage of the present invention is that there is even wear and tear on the parts of the agricultural implement.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
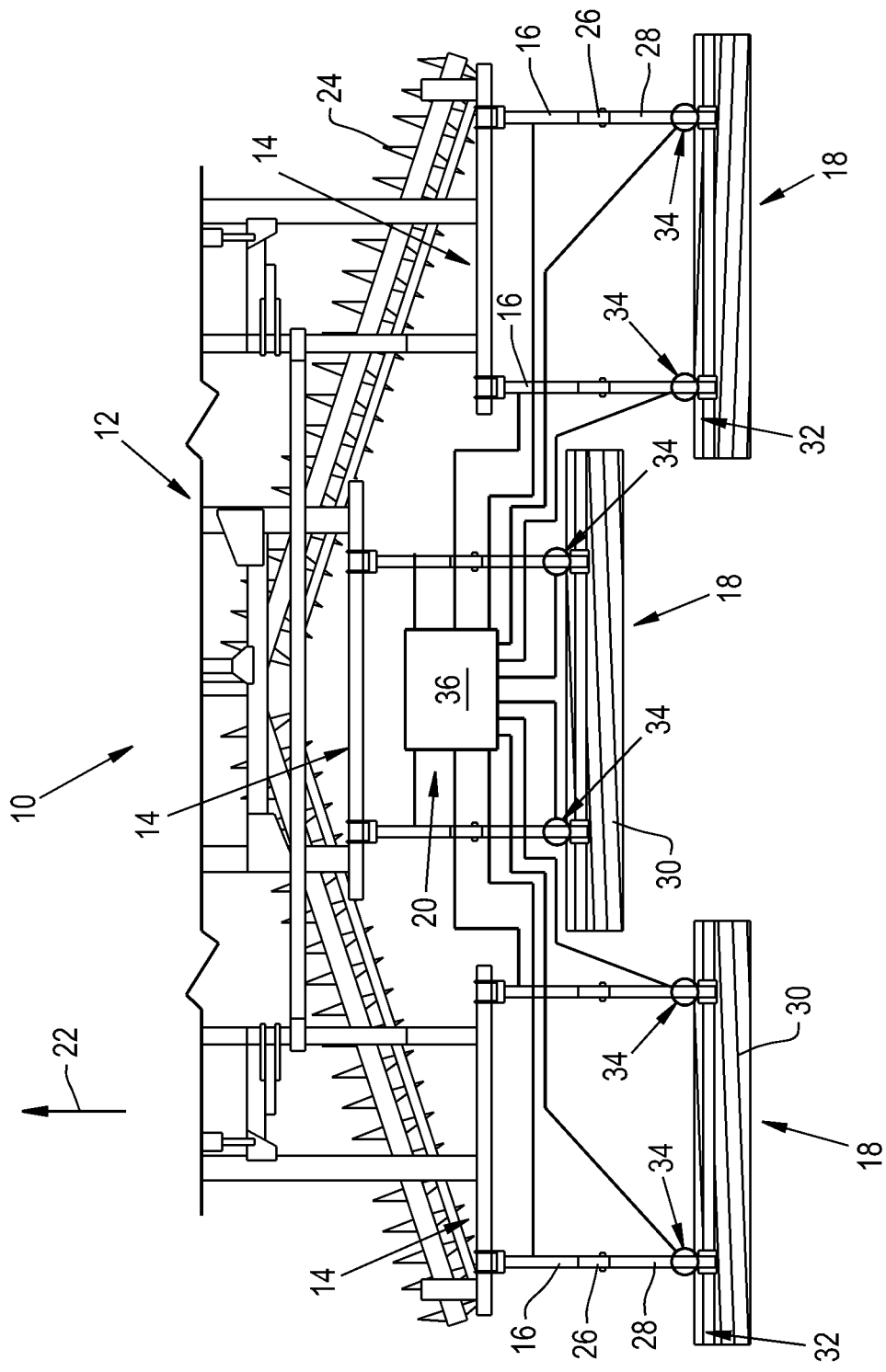
FIG. 1 is a top view of an embodiment of a portion of a tillage implement according to the present invention.

Referring now to the drawings, and more particularly to FIG. 1, there is shown a portion of an agricultural tillage implement 10 which generally includes a main frame 12, auxiliary frames 14, actuators 16, rolling basket assemblies 18, and a pressure control system 20.

The agricultural tillage implement 10 is configured as a multi-section field implement, which includes multiple implements to perform various tasks. The main frame 12 of the agricultural tillage implement 10 is configured to be towed in a travel direction 22 by an agricultural towing vehicle (not shown). In the present embodiment, the main frame 12 attaches a ganged disk harrow 24. However, the main frame 12 may connect various other vertical or horizontal implements. The auxiliary frame 14 is attached rearwardly to the main frame 12. As shown in FIG. 1, there may be three auxiliary frames 14 attached to the main frame 12; however, there may be one auxiliary frame 14 or other multiples of auxiliary frames 14.

Figure 2:
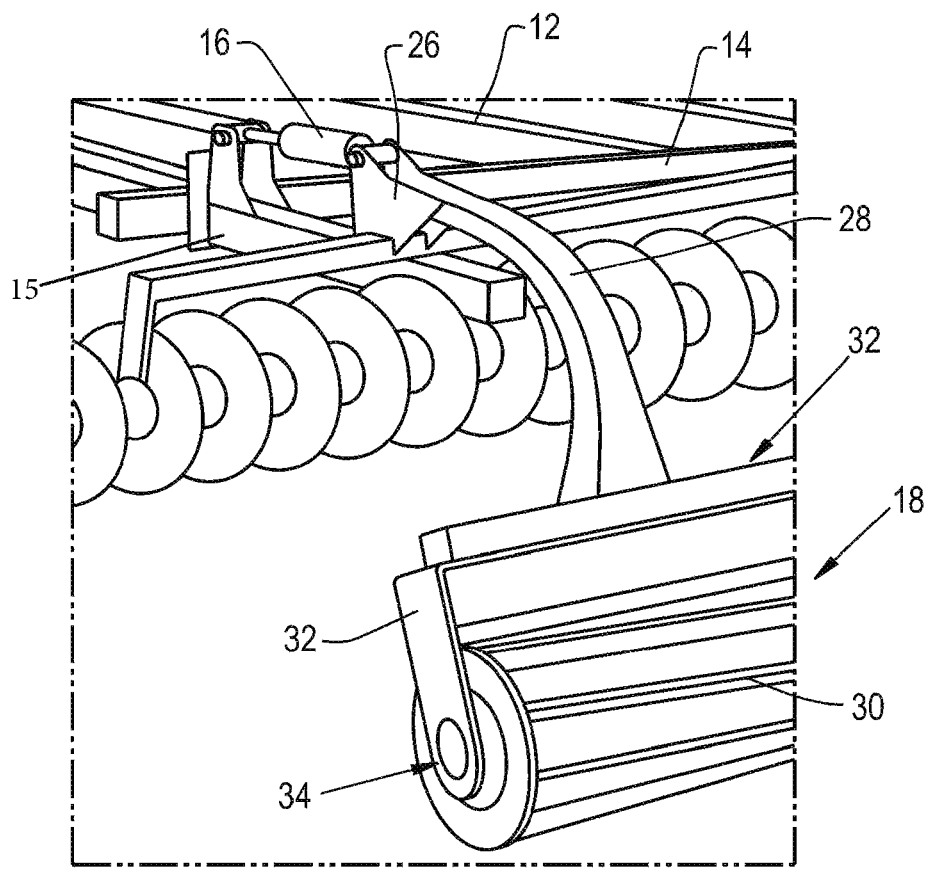
FIG. 2 is a perspective view of another embodiment according to the present invention.

The actuators 16 provide an adjustable downward force to the rolling basket assemblies 18. The actuators 16 are supported by portions 15 of the auxiliary frames 14 which are oriented in the travel 22 direction, and the actuators 16 are pivotally connected to the portions 15 of the auxiliary frames 14 and the brackets 26 which in turn have pivot arms 28 extending therefrom (FIGS. 1-2). The actuators 16 are illustrated as hydraulic cylinders; however, the actuators 16 may be in the form of springs, airbags, or shock absorbers filled with fluid, for example rheological fluid, in order to maintain a constant down force.

The rolling basket assemblies 18 have a rolling basket 30 that is rotationally coupled to a respective sub-frame 32. Each sub-frame 32 is connected to a respective pivot arm 28, which is pivotally connected via bracket 26. The sub-frames 32 engage the rolling baskets 30 through a rotational coupling such that the rolling baskets 30 rotate about a fixed axis. In accordance with the present invention, the rolling basket assemblies 18 may include two or more rolling baskets 30, which can be of the same or different lengths, coupled together to form an effective length.

Figure 3:
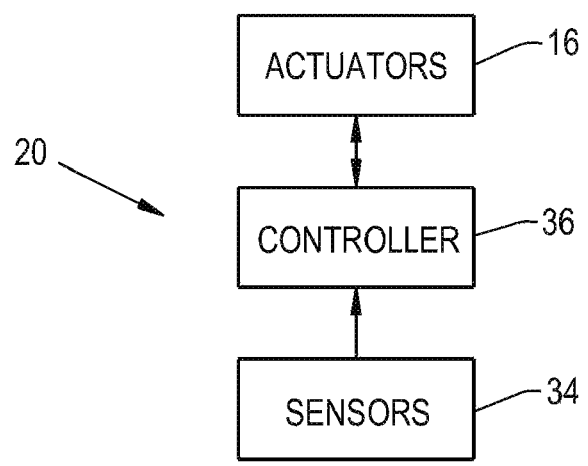
FIG. 3 is a schematic diagram of a pressure control system which can be used by the embodiments shown in FIGS. 1 and 2.

Referring now to FIGS. 1-3, conjunctively, there is shown a pressure control system 20 that includes sensors 34 and a controller 36. The pressure control system 20 is operatively coupled to the rolling basket assemblies 18. The pressure control system 20 may be located in the towing vehicle (not shown) or on the agricultural tillage implement 10. The pressure control system 20 provides the desired pressure to the actuators 16 and thus the appropriate down force to the rolling basket assemblies 18. For example, if the actuators 16 are in the form of hydraulic cylinders, then the pressure control system 20 would further include valves (not shown) in order to manipulate the hydraulic fluid within the hydraulic cylinders and thus apply the down force onto the rolling basket assemblies 18.

The sensors 34 are configured for sensing the down pressure exerted upon the rolling basket assemblies 18. The sensors 34 sense a load exerted on the rolling basket assemblies 18 and provide a downward pressure measurement signal, which is then communicated to the controller 36. The sensors 34 may be located between the pivot arms 28 and the sub-frames 32 of each respective rolling basket assembly 18, as shown in FIG. 1, or alternatively may be located at the connection points between each sub-frame 32 and respective basket 30, as shown in FIG. 2. The sensors 34 communicate the down pressure measurement signal to the controller 36, and are suitably configured, such as load cell sensors or strain gauges.

The controller 36, e.g., a CPU or processor, is configured to control the downward force applied by the actuators 16 dependent upon the down pressure measurement signal provided by the sensors 34. Thus, during operation, the controller 36 maintains a constant down force under varying speeds. For example, if the speed of the towing vehicle increases, the drag force acting on the rolling basket assemblies 18 will change, which in turn alters the down force, and the controller 36 will control the actuators 16 to adjust the down force accordingly. The controller 36 may be located in the towing vehicle or connected to the structure of the tillage implement 10. In the example of having the actuators 16 be hydraulic cylinders, the controller 36 would adjust valves by opening and closing them in order to adjust the pressure in the hydraulic cylinders and thereby adjusting the amount of down force exerted onto the rolling basket assemblies 18. The controller 36 may be programed to receive a desired downward force range and to maintain the adjustable downward force applied by actuators 16 within this specified downward force range. Alternatively, the controller 36 may be programed to receive a specific desired value for the adjustable downward force applied by the actuators 16, and thereby maintain the down force at this desired value during varying speeds of operation.

In operation, an operator sets the desired down force applied to the rolling basket assemblies 18 by inputting a desired down force range into the controller 36. The sensors 34 sense the downward pressure applied to the rolling basket assemblies 18 and then communicate down force data, in the form of a downward pressure measurement signal, to the controller 36. Then, the controller 36 compares the downward pressure measurement signal to the desired downward force range. If the downward pressure measurement signal is outside the desired downward force range, the controller 36 will adjust the actuators 16 to change the downward force exerted on the rolling basket assemblies 18 in order to maintain a uniform field finish. This method can be fully automatic and may be controlled using the latest tractor-implement communication system (i.e. an ISOBUS Class 3 system).

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural tillage implement, comprising:
    a first frame configured to be moved in a travel direction;
    at least one second frame coupled with said first frame, the at least second frame including a frame portion oriented in the travel direction;
    at least one rolling basket assembly including
        the frame portion horizontally oriented and connected at one end to the second frame, pivotal bracket positioned above the frame portion, the pivotal bracket connected to a pivot arm which is connected to a sub-frame, and a rolling basket rotationally coupled to the sub-frame, wherein the pivot arm is configured in a downward extending arch above the sub-frame and rolling basket to support the sub-frame and rolling basket; and
        at least one actuator connected at one end to the frame portion and positioned above the frame portion, the at least one actuator connected at an opposite end to the pivotal bracket, wherein actuation of the at least one actuator results in movement of the pivotal bracket to move the pivot arm, sub-frame, and rolling basket;
    wherein the frame portion, the pivotal bracket, the at least one actuator, and the pivot arm are positioned above the rolling basket; and
    a pressure control system operatively connected to the at least one rolling basket assembly, the pressure control system including:
        at least one sensor coupled to the at least one rolling basket assembly for sensing a load exerted on the at least one rolling basket assembly by a ground surface and providing a downward pressure measurement signal; and
        a controller in communication with the at least one sensor and configured to control the adjustable downward force applied by the at least one actuator.

2. The agricultural tillage implement of claim 1, wherein the controller receives the downward pressure measurement signal and automatically adjusts the adjustable downward force applied by the at least one actuator by determining whether the downward pressure measurement signal is within a desired downward force range in response to a variance of speeds during operation.

3. The agricultural tillage implement of claim 1, wherein the at least one sensor is located between the pivot arm moveably connected to the at least one actuator and the sub-frame of the at least one rolling basket assembly.

4. The agricultural tillage implement of claim 1, wherein the at least one sensor is located at a connection point between the sub-frame and the rolling basket.

5. The agricultural tillage implement of claim 1, wherein the at least one actuator and the pressure control system are operatively connected to a tractor with an ISOBUS Class 3 system.

6. A rolling basket implement attached to an agricultural tillage implement having a first frame and at least one second frame, the second frame including a frame portion oriented in the travel direction, the rolling basket implement comprising:
    at least one rolling basket assembly including
        the frame portion horizontally oriented and connected at one end to the second frame, a pivotal bracket positioned above the frame portion, the pivotal bracket connected to a pivot arm which is connected to a sub-frame, and a rolling basket rotationally coupled to the sub-frame, wherein the pivot arm is configured in a downward extending arch above the sub-frame and rolling basket; and
    at least one actuator connected at one end to the frame portion and positioned above the frame portion, the at least one actuator connected at an opposite end to the pivotal bracket, wherein actuation of the at least one actuator results in movement of the pivotal bracket to move the pivot arm, sub-frame, and rolling basket;
    wherein the frame portion, the pivotal bracket, the at least one actuator, and the pivot arm are positioned above the rolling basket; and
    a pressure control system operatively connected to the at least one rolling basket assembly, the pressure control system including:
        at least one sensor coupled to the at least one rolling basket assembly for sensing a load exerted on the at least one rolling basket assembly by a ground surface and providing a downward pressure measurement signal; and
        a controller in communication with the at least one sensor and configured to control the adjustable downward force applied by the at least one actuator.

7. The rolling basket implement of claim 6, wherein the controller receives the downward pressure measurement signal and automatically adjusts the adjustable downward force applied by the least one actuator by determining whether the downward pressure measurement signal is within a desired downward force range in response to a variance of speeds during operation.

8. The rolling basket implement of claim 6, wherein the at least one sensor is located between the pivot arm moveably connected to the at least one actuator and the sub-frame of the at least one rolling basket assembly.

9. The rolling basket implement of claim 6, wherein the at least one sensor is located at a connection point between the sub-frame and the rolling basket.

10. The rolling basket implement of claim 6, wherein the at least one actuator and the pressure control system are operatively connected to a tractor with an ISOBUS Class 3 system.

* * * * *